March 15, 1966 W. W. SNELL, JR 3,241,079

EXTENDED-RANGE SQUARE-LAW DETECTOR

Filed Sept. 11, 1963 2 Sheets-Sheet 1

INVENTOR
W. W. SNELL, JR.
BY Sylvan Sherman
ATTORNEY

United States Patent Office 3,241,079
Patented Mar. 15, 1966

3,241,079
EXTENDED-RANGE SQUARE-LAW DETECTOR

William W. Snell, Jr., Middletown Township, Monmouth County, N.J., assignor to Bell Telephone Laboratories, Incorporated, New York, N.Y., a corporation of New York Filed Sept. 11, 1963, Ser. No. 308,288
6 Claims. (Cl. 329—204)

This invention relates to electromagnetic wave transmission systems and, in particular, to extended-range, square-law detectors for use in such systems.

The term "square-law" is applied to a detector in which the rectified direct-current output is proportional to the square of the effective value of the applied signal voltage. While any detector is essentially a square-law device when the applied signal is quite small, few detectors maintain their square-law characteristic as the signal level is increased.

It is, accordingly, an object of this invention to extend the range of signal levels over which square-law detection is obtained.

In accordance with the invention the combination of both extended range capability and square-law response is obtained by means of a combination of diodes having complementary individual current-voltage characteristics and terminating resistances of appropriate values.

The invention is based upon the recognition that the current-voltage characteristic of a diode can be modified by the addition, in series or in parallel with the diode, of appropriate complementary circuit elements. These elements can have either a linear current-voltage characteristic, such as is obtained with a simple resistor, or the current-voltage characteristic of the added element can be higher or lower order than linear, such as is obtainable with a diode.

To obtain extended-range, square-law diode detection requires that the current-voltage characteristic of the diode be modified over the regions where it deviates from square-law. More specifically, if the current-voltage relationship of the diode, given by $I=kE^n$, deviates from square-law (i.e., $n\neq 2$) it can be made square-law by the addition in parallel or in series with it of a second diode having a complementary current-voltage relationship. Thus, over the interval where $n<2$, the characteristic of the added complementary diode is greater than square-law, whereas when $n>2$, the characteristic of the added complementary diode is less than square-law.

In addition to modifying the exponent $n$, the addition of elements in series or parallel tends to modify the net proportionality constant $k$. Thus, adding a diode in series tends to lower $k$ whereas adding a diode in parallel tends to increase the amplitude of the resulting proportionality constant.

In a specific, illustrative embodiment of the invention to be described in greater detail hereinafter, the input-output response of a first diode of a first type having a current-voltage characteristic that is greater than square-law at low voltage levels and again at high voltage levels and square-law at intermediate voltage levels is modified to be square-law over an extended range of voltage levels by the addition in parallel with it of a second diode of a second type having a complementary characteristic. However, because the proportionality constants of the two diodes are very different, each is corrected so as to bring their respective characteristics into closer juxtaposition over the operating range of interest. This is done by adding in series with the second diode, a third diode of the first type and by adding in parallel with the first diode a fourth diode of the first type.

Having obtained an approximate square-law response in this manner, it was further discovered that varying the D.C. load resistance tended to modify the slope of the over-all response, thus affording a final fine control over the composite current-voltage characteristic.

These and other objects and advantages, the nature of the present invention, and its various features, will appear more fully upon consideration of the various illustrative embodiments now to be described in detail in connection with the accompanying drawings, in which:

FIG. 1 is a schematic diagram of an illustrative embodiment of an extended-range, square-law detector in accordance with the invention;

FIG. 2, included for purposes of explanation, shows several idealized diode characteristics and the effect of their combination in series and in parallel;

Figure 4:
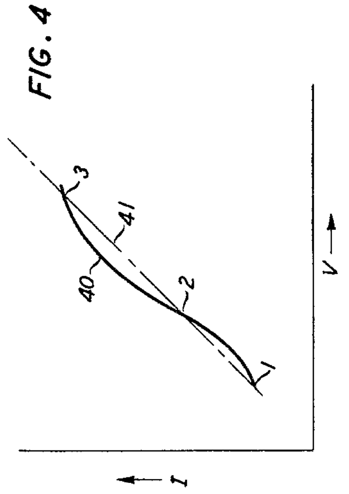
Figure 1:
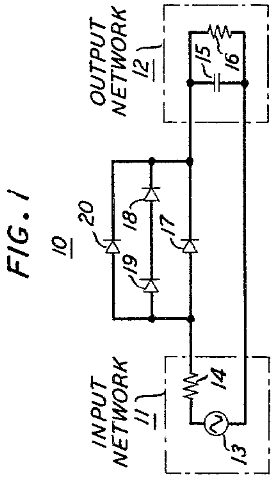
Figure 3:
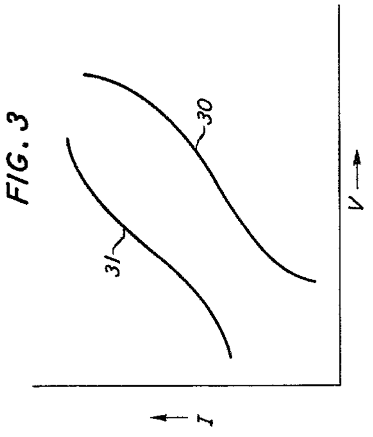
Figure 5:
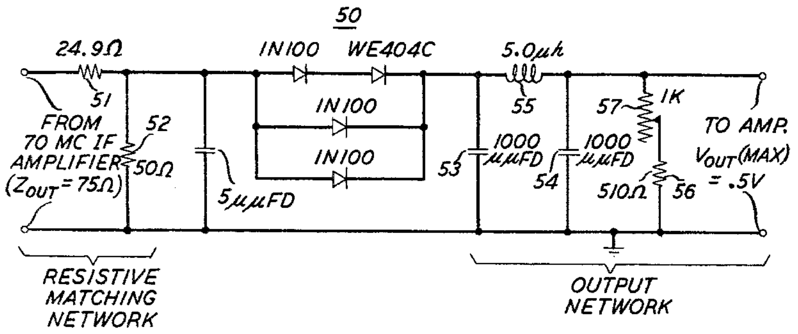
Figure 6:
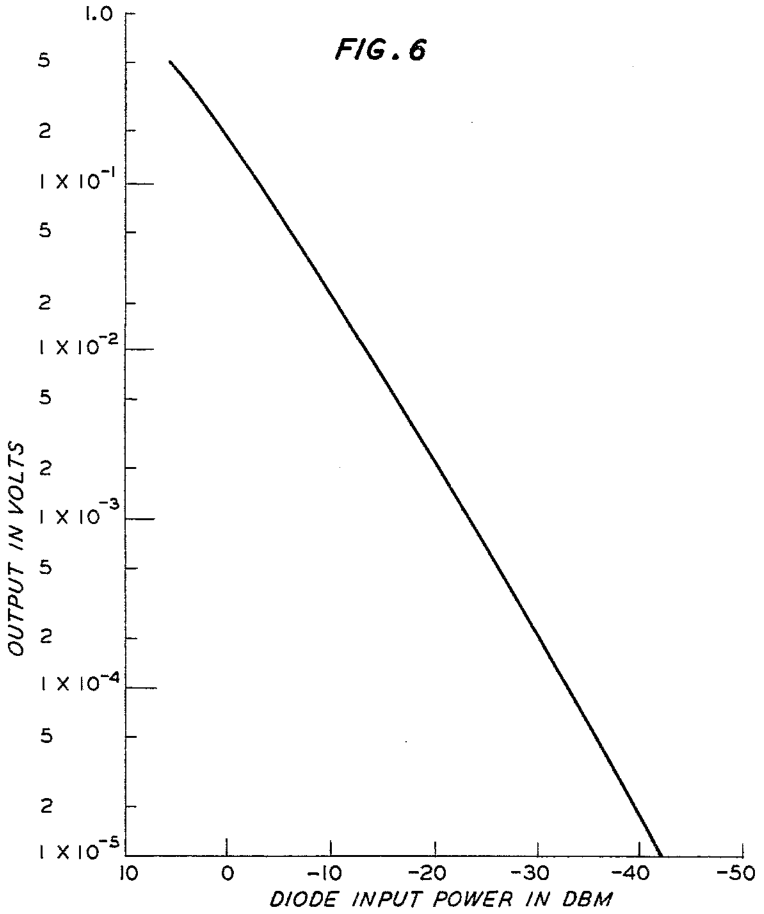

FIGS. 3 and 4, included for purposes of explanation, show the measured current-voltage characteristics of the diodes utilized in the embodiment of FIG. 1 and their resulting characteristic when combined in the manner illustrated;

FIG. 5 is a complete schematic of an extended-range, square-law detector in accordance with the invention; and FIG. 6 is the measured input-output curve for the detector shown in FIG. 5.

Referring to FIG. 1, there is shown a specific embodiment of an extended-range, square-law detector in accordance with the invention. The detector 10 is connected between an input network 11 and an output network 12. Typically, the input network comprises a signal source 13 having an impedance $R_1$, represented by the resistor 14.

The output network typically has a very low impedance at the signal frequency, represented by the capacitor 15, and a finite resistance $R_2$ for direct current, represented by the resistor 16.

This particular embodiment of a square-law detector in accordance with the invention, comprises a network of four diodes 17, 18, 19 and 20 connected in a series-parallel arrangement, with diode 17, the series combination of diodes 18 and 19, and diode 20 all forming separate branches parallelly connected. The diodes, of which 17, 18 and 20 are of one type and 19 is of another type, are all poled in the same direction and connected, as a unit, in series between the input network 11 and the output network 12.

The operation of the square-law detector shown in FIG. 1 can best be understood by considering the effect of each of the diodes upon the over-all detector characteristic. This is best illustrated by reference to FIG. 2 which shows some idealized diode current-voltage (I–V) characteristics and the resulting characteristic produced by their combined action.

Curve 24, drawn in solid line to a log-log scale, is the characteristic of a diode that is greater than square-law at low voltage levels, region *a*; square-law at intermediate voltage levels, region *b*; and greater than square-law at high voltage levels, region *c*.

In the ideal situation, the characteristic represented by curve 24 could be modified and made to be square-law over regions *a* and *c* by means of a second diode having a complementary characteristic defined by curve 21, shown dotted. Curve 21 has an I–V characteristic that is less than square-law over a region *a'* that is coextensive with region *a*, and less than square-law over a region *c'* that is coextensive with region *c*. In addition, curve 21 is square-law over a region *b'* that is coextensive with region *b* and, in addition, has the same proportionality constant *k* as curve 24. If the slopes of the two curves over the regions $a$, $a'$, $c$ and $c'$ are complementary, the resulting current-voltage characteristic of the combined diodes can be made square-law over the entire operating range $a$–$b$–$c$.

Figure 2:
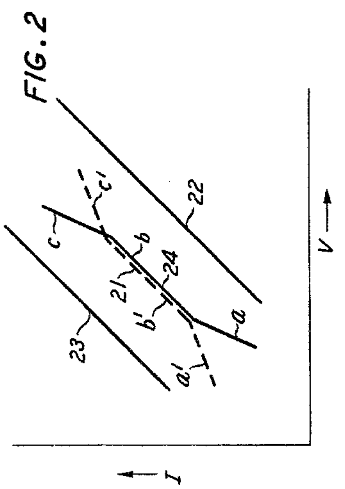
FIG. 2A shows a pair of series-connected complementary diodes.
FIG. 2B shows a pair of parallel-connected complementary diodes.
Figure 2A:
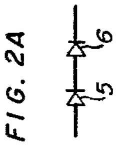

The proportionality constant of the resulting characteristic, however, depends upon how the diodes are combined. If the two complementary diodes 5 and 6 are combined in series as illustrated in FIG. 2A, the current through each diode is the same and the total voltage across the two diodes is the sum of the voltages across the individual diodes. Thus, the series-connected composite characteristic, curve 22, is shifted to a region of higher voltages as shown in FIG. 2.

Figure 2B:
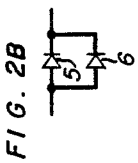

When the two complementary diodes 5 and 6 are combined in parallel as illustrated in FIG. 2B, the voltage across both is the same but the currents are added. This has the effect of shifting the parallel-connected composite characteristic, curve 23, to a region of higher current as is also shown in FIG. 2.

The manner of interconnecting the diodes is important in a practical situation as will become apparent hereinbelow, since in practice the diodes being combined typically do not have the precise proportionality constants and slopes needed for proper compensation. As a result, it is generally necessary to modify their characteristics and slopes by means of a combination of diodes.

Referring again to the embodiment of FIG. 1, the diode sought to be corrected is diode 17. This diode, which for example is assumed to be a type IN100, has a current-voltage characteristic as shown by curve 30 in FIG. 3. This curve is similar to the idealized curve 24 of FIG. 2 in that it is greater than square-law at low and high levels and approximately square-law at intermediate levels. It was sought to correct this response by means of a diode 19 placed in parallel with diode 17. Diode 19, which is a Western Electric type 404C, has a response as given by curve 31. In general, curve 31 has the proper complementary shape to compensate curve 30. That is, it is less than square-law over the voltage ranges over which curve 30 is greater than square-law. However, for any given voltage, the 404C draws substantially more current than the IN100 and as a result tends to dominate the combined response when connected in parallel with the IN100.

To more closely align the response of the two characteristics, each had to be modified. This was done by adding a second IN100 in parallel with the first and by adding a third IN100 in series with the 404C. This had the effect of placing the two modified curves in closer juxtaposition over an extended region. The resulting over-all characteristic of the diode arrangement is shown as curve 40 in FIG. 4. Curve 40 is substantially square-law over the desired range, crossing the square-law reference curve 41 at points 1, 2 and 3, and deviating slightly from square-law between these points.

The final over-all detector network characteristic, however, is influenced by two additional circuit factors. The first of these is the generator impedance 14. This can be regarded simply as a less than square-law series element whose effect upon the over-all response is the same as that produced by the less than square-law portion of a series-connected diode. However, because impedance 14 is generally small (i.e., about 100 ohms or less) its effect is noticeable only at the upper portion of the response where the current is largest. At lower current levels, the effect of the generator impedance upon the detector response is typically negligible.

The second factor is the D.C. load impedance 16 of the output network. This impedance does not modify the detector characteristic in the same manner as does the generator impedance since the D.C. load impedance is not part of the high frequency signal circuit. It has been found, however, that the effect of varying resistor 16 is to change the slope of the entire detector characteristic curve. This very conveniently allows for a final adjustment of the over-all detector network response thereby making the process of matching diode characteristics that much less critical.

FIG. 5 is a complete schematic diagram of the detector shown in FIG. 1. The input signal is derived from a 70 mc. generator whose output impedance is 75 ohms. The signal is applied to the series-parallel combination of diodes 50 through a resistance matching network of resistors 51 and 52. The output from diodes 50 is applied to an output network which includes a high frequency filter comprising capacitors 53 and 54 and inductor 55. The direct-current load comprises resistor 56 and the variable resistor 57. The D.C. load is variable to permit adjustment of the slope of the detector curve as explained herinabove. The output voltage developed across resistors 56 and 57 is applied to a suitable amplifier (not shown) in a manner well known in the art.

The over-all response of the detector shown in FIG. 5 is given by the curve in FIG. 6 which relates the power applied to the diodes 50 to the voltage developed across the D.C. load resistors. The curve is seen to be substantially linear over an extended range and has a slope which indicates a square-law response.

It is understood that the detector shown in FIGS. 1 and 5 is intended merely to be illustrative. That is, other arrangements of diodes can be used, depending upon the specific I–V characteristics of the diodes used. Similarly, more than two different diodes can be used, if necessary, to achieve the required complementary characteristics. Thus, it is understood that the above-described arrangement is illustrative of but one of the many specific embodiments which can represent applications of the principles of the invention. Numerous and varied other arrangements can readily be devised in accordance with these principles by those skilled in the art without departing from the spirit and scope of the invention.

What is claimed is:

1. A square-law detector comprising:

a first diode having a current-voltage characteristic which deviates from square-law over portions thereof;

means for correcting said deviations from square-law over a range of voltages comprising at least one additional diode having a complementary current-voltage characteristic over said given range interconnected with said first diode;

means for coupling a high frequency signal to said diodes;

and an output circuit including a resistor connected in series with said diodes.

2. The detector in accordance with claim 1 wherein said first diode and said correcting means are connected in parallel between said coupling means and said output circuit.

3. The detector in accordance with claim 1 wherein said first diode and said correcting means are connected in series between said coupling means and said output circuit.

4. The detector in accordance with claim 1 wherein said resistor is variable for adjusting the slope of the composite characteristic of said first diode and said correcting means.

5. The detector in accordance with claim 1 wherein said correcting means comprises a plurality of diodes connected in a series-parallel configuration between said coupling means and said output circuit.

6. A detector circuit comprising:

a source of alternating-current signal;

an output circuit including a low impedance path for said signal current in parallel with a resistive path;

rectifying means whose current-voltage relationship is substantially square-law over a range of operating voltages connected between said signal source and said output circuit comprising a plurality of shunt paths;

a first and a second of said paths each including a unilaterally conducting element whose current-voltage relationship is defined by $I=kV^n$ where I is the current through said element, V is the voltage across the element, $n$ is greater than two at low voltage levels and at high voltage levels and substantially equal to two at intermediate voltage levels;

a third path including two series-connected unilaterally conducting elements;

the first of said series-connected elements having a current-voltage relationship that is substantially the same as that of said unilaterally conducting elements in said first and second paths;

the second of said series-connected elements having a current-voltage relationship wherein $n$ is less than two at low and high voltage levels and substantially equal to two at intermediate voltage levels;

and wherein the proportionality constant $k$ for said second of said series-connected diodes is greater than the proportionality constant of said first diodes.

References Cited by the Examiner

UNITED STATES PATENTS

| | | | |
|---|---|---|---|
| 2,679,584 | 5/1954 | MacDonald -------- | 329—204 |
| 3,037,129 | 5/1962 | Le Bel ---------- | 328—145 X |
| 3,086,166 | 4/1963 | Salvatori. | |

ROY LAKE, *Primary Examiner.*

ALFRED L. BRODY, *Examiner.*